(12) United States Patent
Wai

(10) Patent No.: US 10,962,771 B2
(45) Date of Patent: Mar. 30, 2021

(54) ACHROMATIC OPTICAL SYSTEM WITH LIQUID LENS

(71) Applicant: Man Kit Louis Wai, Hong Kong (CN)

(72) Inventor: Man Kit Louis Wai, Hong Kong (CN)

( * ) Notice: Subject to any disclaimer, the term of this patent is extended or adjusted under 35 U.S.C. 154(b) by 187 days.

(21) Appl. No.: 16/069,175

(22) PCT Filed: Oct. 9, 2016

(86) PCT No.: PCT/CN2016/101530
§ 371 (c)(1),
(2) Date: Jul. 11, 2018

(87) PCT Pub. No.: WO2017/124778
PCT Pub. Date: Jul. 27, 2017

(65) Prior Publication Data
US 2019/0025575 A1    Jan. 24, 2019

Related U.S. Application Data

(60) Provisional application No. 62/281,732, filed on Jan. 22, 2016.

(51) Int. Cl.
*G02B 1/06* (2006.01)
*G02B 3/12* (2006.01)
*G02B 27/00* (2006.01)
*G02B 3/14* (2006.01)

(52) U.S. Cl.
CPC ........... *G02B 27/0025* (2013.01); *G02B 3/12* (2013.01); *G02B 3/14* (2013.01)

(58) Field of Classification Search
CPC ...... G02B 3/14; G02B 26/005; G02B 26/004; G02B 3/12; G02B 1/06; G02B 13/005; G02B 13/0075; G02B 27/0025
See application file for complete search history.

(56) References Cited

U.S. PATENT DOCUMENTS

| | | | |
|---|---|---|---|
| 4,911,538 A | | 3/1990 | Robb |
| 4,958,919 A | * | 9/1990 | Sigler .................... G02B 1/06 359/665 |
| 5,182,585 A | * | 1/1993 | Stoner .................... G02B 3/14 351/158 |
| 5,491,583 A | | 2/1996 | Robb |
| 5,682,263 A | | 10/1997 | Robb et al. |
| 5,684,636 A | | 11/1997 | Chow et al. |
| 5,731,907 A | | 3/1998 | Sigler |
| 6,288,846 B1 | * | 9/2001 | Stoner, Jr. ............... G02B 1/06 351/159.68 |

FOREIGN PATENT DOCUMENTS

WO    2009099585    8/2009

* cited by examiner

*Primary Examiner* — Alicia M Harrington
(74) *Attorney, Agent, or Firm* — Eagle IP Limited; Jacqueline C. Lui

(57) ABSTRACT

A lens system (100,200,300,400,500) that employs one or more liquids (130,230,340,350) to participate in correcting chromatic aberration. The liquids (130,230,340,350) are natural or having manually adjusted physical properties. The liquids (130,230,340,350) are filled in a chamber (430,540, 550) formed by a frame and a lid (150,250,370,450,570) on a top surface of the frame, and a base (140,240,360,440,560) on a bottom surface of the frame.

17 Claims, 5 Drawing Sheets

ACHROMATIC OPTICAL SYSTEM WITH LIQUID LENS

FIELD OF THE INVENTION

The present invention relates to an achromatic optical system that utilizes liquid in lens elements, and more particularly to lens system that correct chromatic aberration.

BACKGROUND

A common physical problem or phenomenon associated with optical systems is chromatic aberration. Chromatic aberration is a physical phenomenon resulting from dispersion in which a lens fails to focus all colors or different wavelength of light, to the same convergence point. It occurs because lenses have different refractive indices for different wavelengths of light. A lens system that corrects chromatic aberration is said to be a "color-corrected" or achromatic lens system. An achromatic lens system brings light rays with different color or wavelength to a common focus on the optical axis of the system. Therefore it can improve the resulting image quality of the optical system.

At present almost all achromatic lens systems use expensive special characteristic optical glasses or crystals. Lenses made of glasses or crystals, however, are costly and hard to manufacture and may require individual special grinding and polishing processes.

A better, both in performance and in production process point of view, optical system for correcting chromatic aberration would be desired.

SUMMARY OF THE INVENTION

Figure 1:
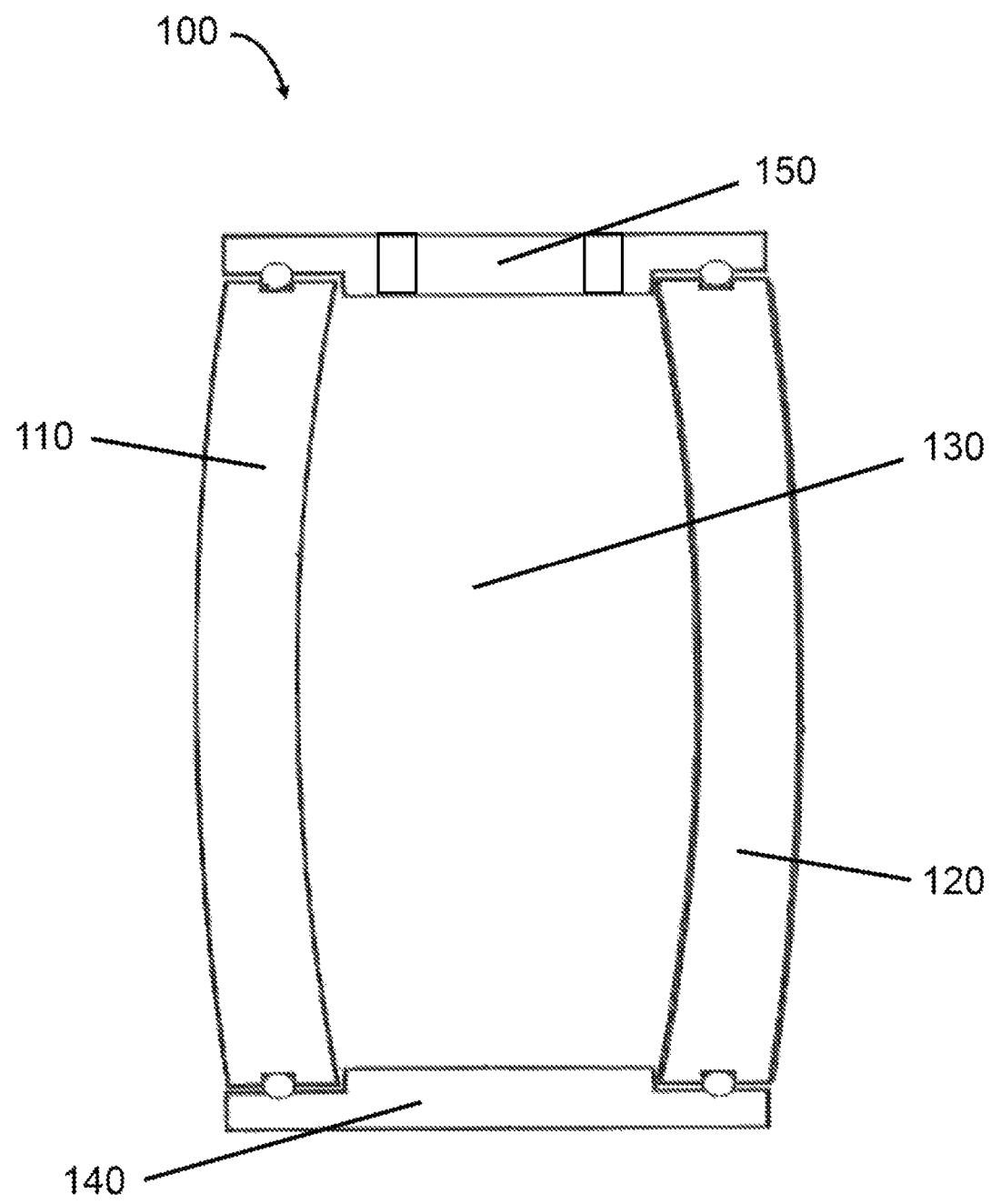
FIG. 1 shows a structure diagram of a liquid lens system in accordance with an example embodiment.

One example embodiment is a liquid lens system that includes a frame formed of a transparent solid material, and includes an internal chamber filled with a liquid, a lid formed on a top surface of the frame, and a base formed on a bottom surface of the frame, such that the frame, the lid, and the base form the internal chamber filled with the liquid.

Other example embodiments are discussed herein.

DETAILED DESCRIPTION

Example embodiments include a liquid lens system that includes solid and liquid lens elements, which is well-corrected for chromatic aberration. The cost of liquids for use as lens elements is relatively low in comparison with the cost of optical glasses and/or crystals with special characteristics, which relies on individual grinding after casting process to achieve required precise curvature. Furthermore, solid lenses have high production cost, complicated processes and low yield due to defects, such as dirt, impurities, dust and bubbles, which could degrades the final quality of the lens system. The bigger the lens, the harder to find zero defect material specimens to build the lens. Liquids that do not present those significant problems with respect to chemical reactivity and fabrication are readily available for use as lens elements in color-corrected optical systems. Furthermore, optical properties of liquid, such as the refractive index of the liquid are able to be fine tuned through mixing different liquids or dissolving soluble transparent substance (s) into liquids.

Example embodiments of lens systems with transparent solid and liquid lens elements are described. The liquid lens is formed by liquid that is filled in a chamber formed by the walls of a frame, together with a bottom cover and a top cover that are separately formed or integrally formed with each other and include water resistant sealing components. The shape of the liquid lens is defined by the curvature of the walls, which also function as solid lenses.

The solid lenses are made of transparent materials or substances such as plastics or glasses, but not only limited to plastics or glasses. Plastics are generally much lighter than glasses of same dimensions. Furthermore, in some instance, there are advantages with respect to manufacturing with plastics since plastics can be made by injection molding without requiring individual optical grinding and polishing processes. Besides, plastics are less easy to be broken compared to glasses.

In one example embodiment, the frame or walls are formed of polymethyl methacrylate (PMMA) and the liquid is formed of white vinegar. Walls of the frame function as solid lenses and the liquid solutions filled inside the chamber function as liquid lenses. The solid and liquid lenses coact with each other to form an optical axis and focus a visible light at discrete wavelengths onto a focal point on the optical axis of the system. The solid lenses compensates for chromatic aberration caused by the liquid lens such that the lens system is achromatic over a range of wavelengths between 486.1 nm and 656.3 nm.

In one example embodiment, the liquid lens system includes two liquid lenses and three solid lenses. The solid lenses function as walls to house the liquid. Each wall has a uniform thickness from the center at the optical axis of the system to its edge. The solid lenses in this example are of no optical function.

The arrangement and curvature of the solid lenses or walls define the shapes of the liquid lenses. In one example embodiment, the first liquid lens is of a concave shape and is formed of white Khouang oil. The second liquid lens is of a convex shape and is formed of white vinegar. The first liquid lens and the second liquid lens coact with each other to form an optical axis and compensate for chromatic aberration and focus a visible light at discrete wavelengths passing through the liquid lens system onto a focal point on the optical axis. For example, the liquid lens system is achromatic for a visible light at wavelengths of 486.1 nm and 656.3 nm at a focal length of 670 mm.

FIG. 1 shows the structure of a liquid lens system 100 in accordance with an example embodiment. The liquid lens system includes a first solid lens 110, a second solid lens 120 and a transparent liquid 130 filled therebetween. A base 140 and a lid 150, together with the two solid lenses and plural sealing components form a sealed container for the liquid filled inside. The liquid allows for variability in shape which is defined by the curvature of the first solid lens 110 and the second solid lens 120. Both the first solid lens and the second solid lens have a uniform thickness from the center to its edge.

By way of example, the focal length of the liquid lens system is dependent on the refractive index of the liquid filled inside and curvatures of the solid lenses. To fulfill the requirements of a variable lens, the liquid filled inside is replaceable. Based on the focal length requirement, different types of liquids, for example, sugar solution or salt solution or a combination of both, are selected to fill inside the sealed container formed by the solid lenses.

Figure 2:
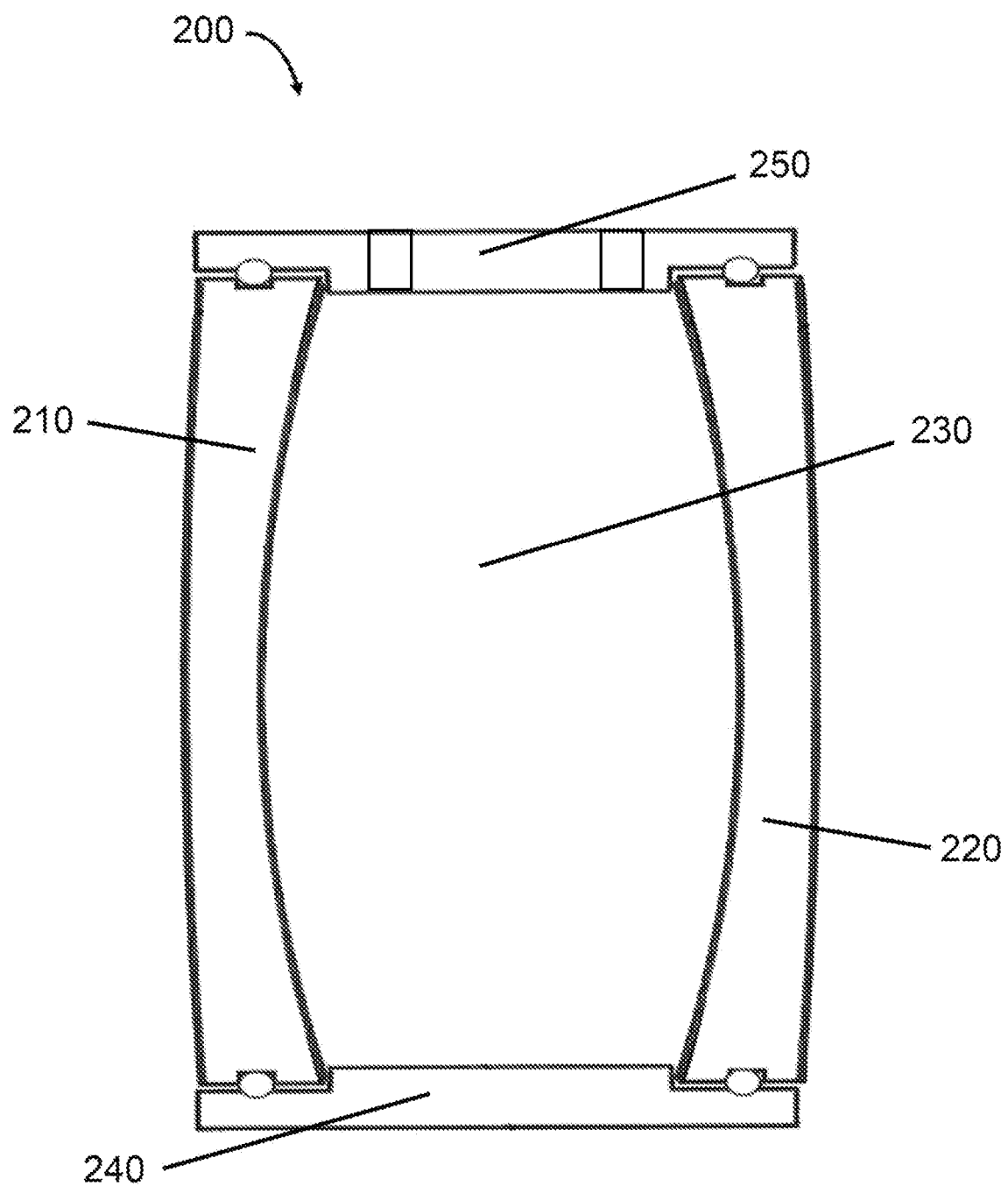
FIG. 2 shows a structure diagram of a liquid lens system that corrects chromatic aberration in accordance with an example embodiment.

FIG. 2 shows the structure of a liquid lens system 200 that corrects chromatic aberration in accordance with an example embodiment. The liquid lens system includes a first solid lens 210, a second solid lens 220 and a transparent liquid 230 filled therebetween. A base 240 and a lid 250 are formed integrally with each other. The base and the lid, together with sealing components and the two solid lenses form a sealed container for the liquid to fill inside. The liquid allows for variability in shape which is defined by the curvature of the inner surfaces of the first solid lens and the second solid lens. Both the first solid lens and the second solid lens have a non-uniform thickness from the center to its edge. For example, the thickness is thinner at the center and thicker at the edge. The curvature of the lenses, the thickness variation from the center to the edge of the solid lens, and the refractive index of the lenses are carefully designed in combination to correct chromatic aberration.

By way of example, the first solid lens and the second solid lens coact with the liquid to form an optical axis and counterbalance chromatic aberration. This achromatic liquid lens system as a whole is able to focus different colors of a visible light at discrete wavelengths passing through the liquid lens system into the same focus in the same plane.

Figure 3:
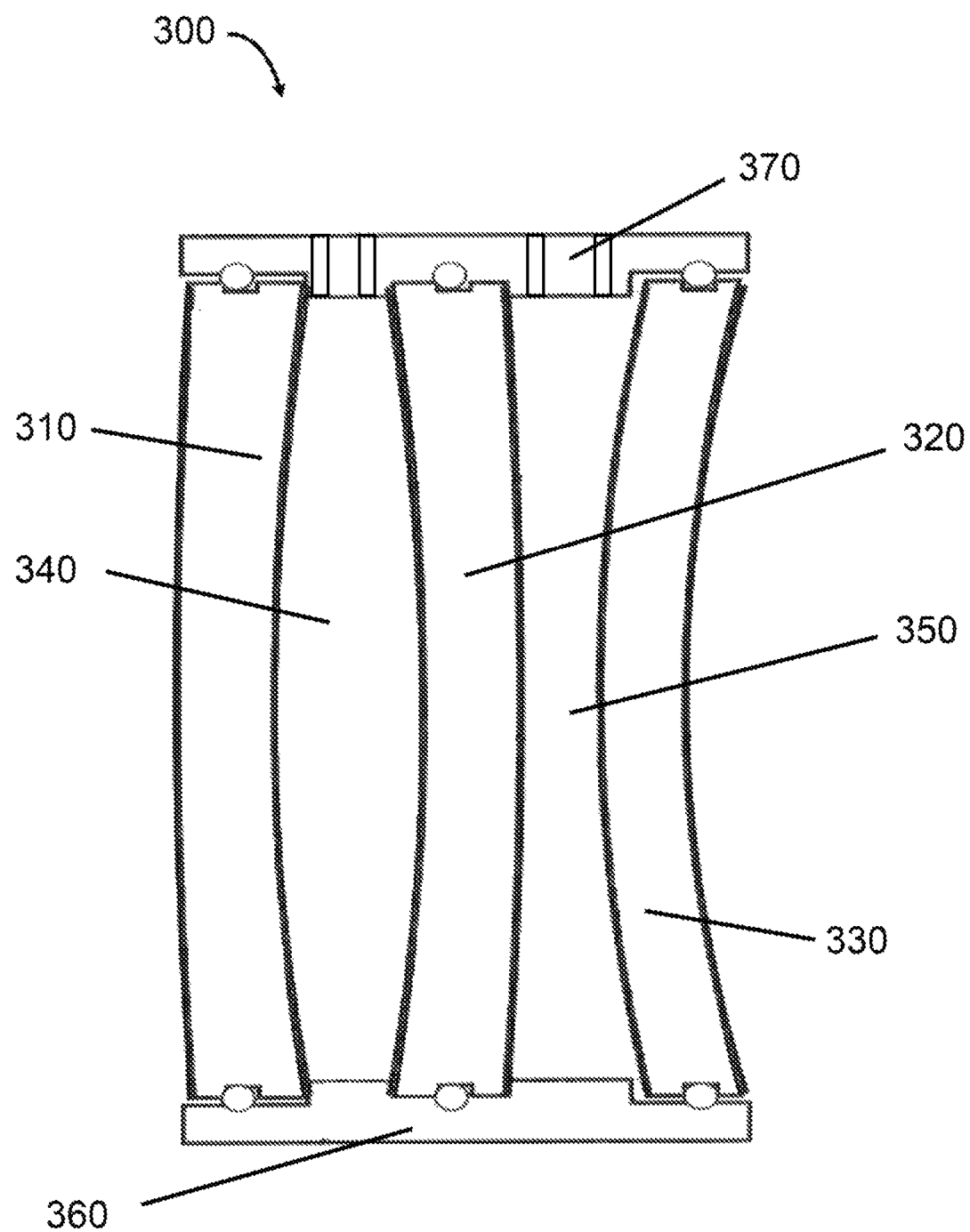
FIG. 3 shows a structure diagram of a liquid lens system that corrects chromatic aberration in accordance with another example embodiment.

FIG. 3 shows the structure of a liquid lens system 300 that corrects chromatic aberration in accordance with another example embodiment. The liquid lens system includes a first solid lens 310, a second solid lens 320, a third solid lens 330, a first transparent liquid 340 filled between the first solid lens and the second solid lens to form a first liquid lens, and a second transparent liquid 350 filled between the second solid lens and the third solid lens to form a second liquid lens. A base 360 and a lid 370, separately formed or integrally formed with the solid lenses form sealed containers to house the liquids.

The liquids allow for variability in shape which is defined by the curvature of the first solid lens, the second solid lens and the third solid lens. In one example embodiment, the first liquid lens is of a convex shape and the second liquid lens is of a concave shape.

By way of example, the solid lenses 310 and 320 are identical in shape and size with the same radius of curvature and uniform thickness from the center at the optical axis to the edge at the lid and base. This arrangement of solid lenses 310 and 320 is for easy production and is not limited to identical lens, both in curvature and in material. The solid lens 330 has a uniform thickness from the center to edge and has a predetermined dimension which is not necessary identical to the solid lenses 310 or 320. The selection of liquid combination, curvatures of the solid lenses and the refractive index of the liquid lenses in combination are carefully designed to correct chromatic aberration.

Figure 4:
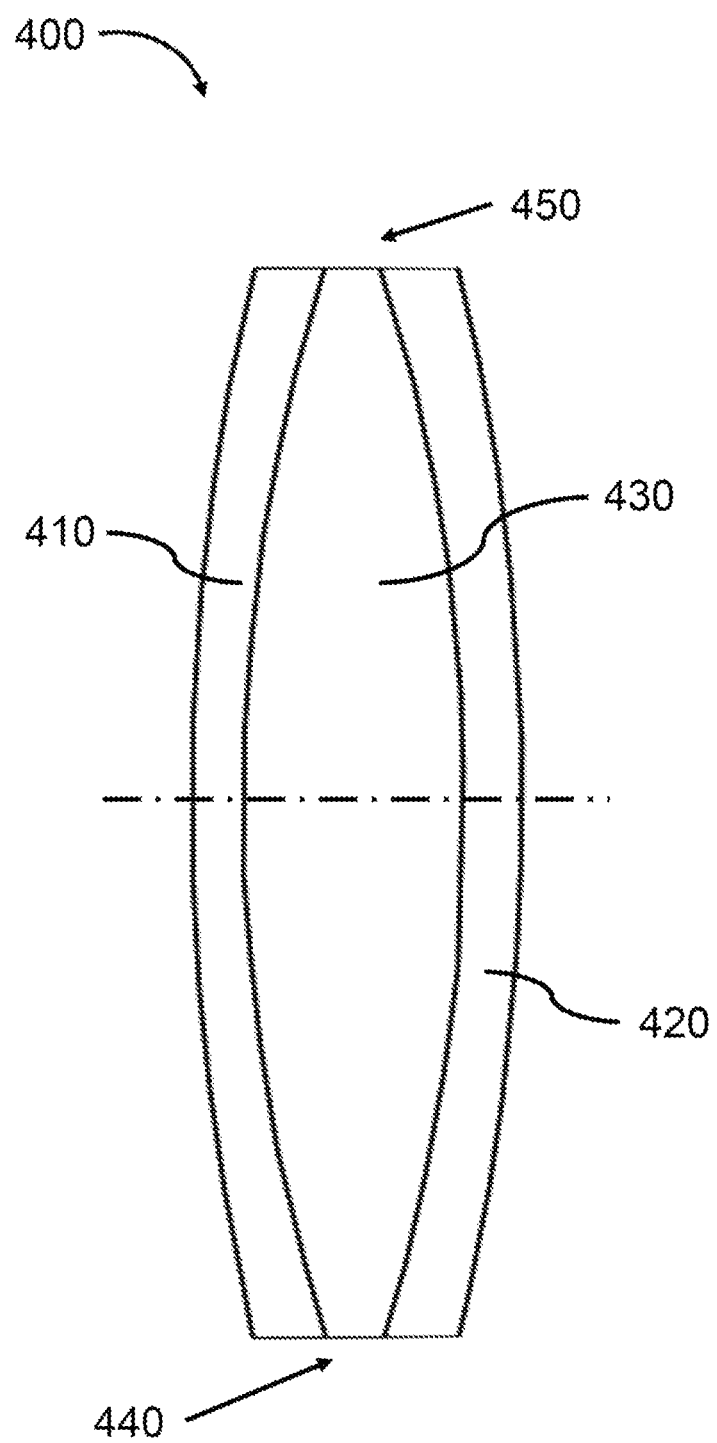
FIG. 4 shows a structure diagram of a liquid lens system that corrects chromatic aberration in accordance with an example embodiment.

FIG. 4 shows the structure diagram of a liquid lens system 400 that corrects chromatic aberration in accordance with an example embodiment. The liquid lens system includes a frame comprising a first wall or solid lens 410 and a second wall or solid lens 420. A top cover or lid 450 is formed on a top surface of the frame. A bottom cover or base 440 is formed on a bottom surface of the frame. The base and the lid are integrally formed with each other such that the frame, the lid, and the base form an internal chamber 430 with sealing components. The chamber is filled with a liquid that contacts the first and second walls, the base and the lid. The liquid function as a liquid lens allowing for variability in shape which is defined by the curvature of the inner surfaces of the first and second walls or solid lens.

In one example embodiment, the first and second solid lenses have a non-uniform thickness from the center at the optical axis of the liquid lens system to the edge at the top or bottom cover. The thickness at the center of the solid lens along the optical axis is 2 mm, and the thickness at the edge of the solid lens is 2.77 mm. The diameter of the first and second solid lens, for example, is 94 mm.

Each of the first and second solid lens has an inner surface in contact with the liquid and an outer surface exposed to air. The curvature of the inner surfaces defines the shape of the liquid lens. In one example embodiment, the chamber formed by the first and second solid lens is 8.88 mm wide at the optical axis and 2 mm wide at the edge. The radius of curvature of the inner surface of the first and second walls is 323.2 mm, and the radius of curvature of the outer surface of the first and second walls is 415.9 mm.

In one example embodiment, the liquid filled inside the chamber is white vinegar with a refractive index of 1.3495 at a wavelength of 589.3 nm. The first and second walls are formed of a transparent solid material that the filled liquids do not permeate through, for example polymethyl methacrylate (PMMA) with a refractive index of 1.4860 at a wavelength of 589.3 nm.

By way of example, the first wall, the second wall and the liquid, which function as the first solid lens, the second solid lens, and the liquid lens, respectively, coact with each other to form an optical axis and compensate for chromatic aberration. The liquid lens system focuses a visible light at discrete wavelengths passing through the liquid lens system onto a focal point on the optical axis. For example, the liquid lens system is achromatic for a visible light at wavelengths of 486.1 nm and 656.3 nm at a focal length of 670 mm.

Figure 5:
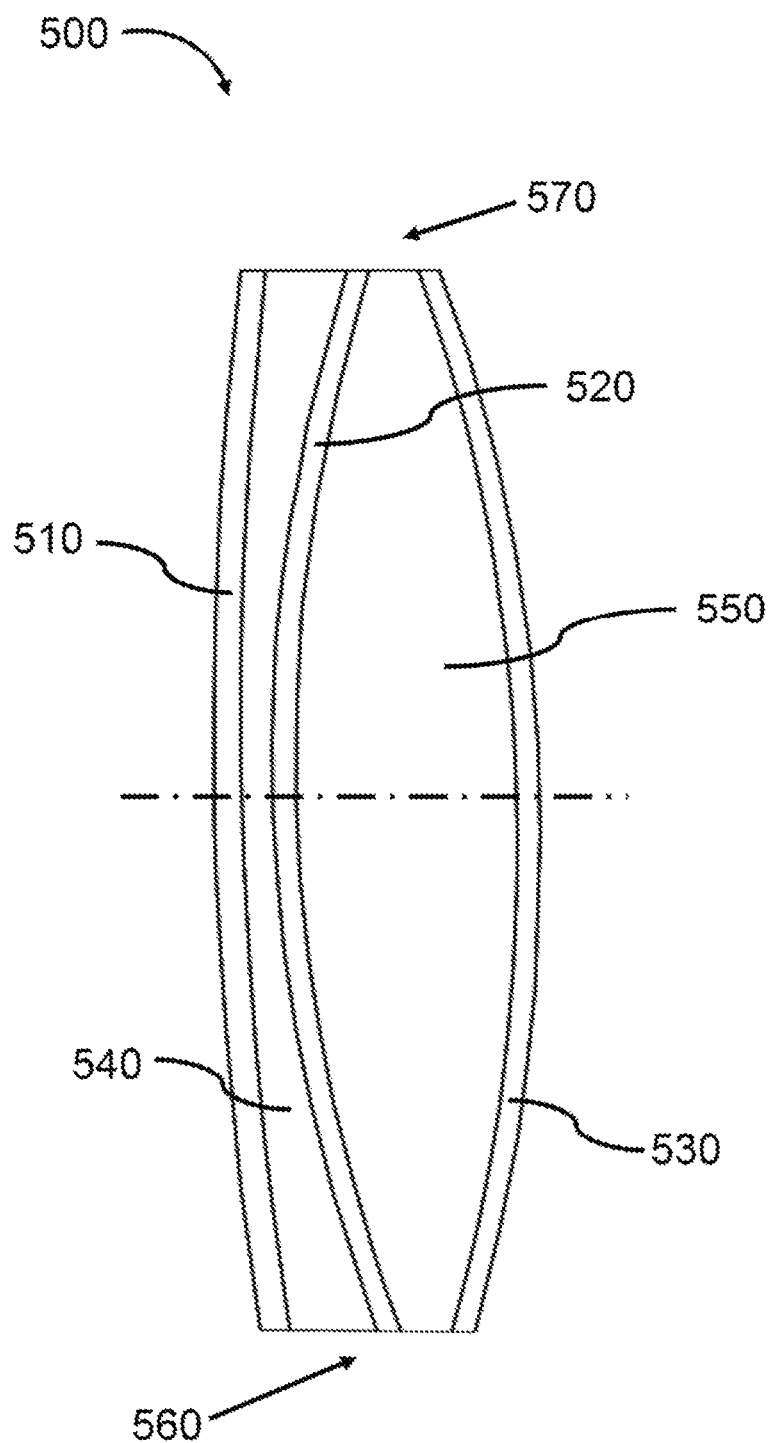
FIG. 5 shows a structure diagram of a liquid lens system that corrects chromatic aberration in accordance with another example embodiment.

FIG. 5 shows the structure of a liquid lens system 500 that corrects chromatic aberration in accordance with another example embodiment. The liquid lens system includes a frame comprising a first wall 510, a second wall 520 and a third wall 530. The second wall is disposed between the first wall and the third wall. A top cover or lid 570 is formed on a top surface of the frame. A bottom cover or base 560 is formed on a bottom surface of the frame. In one example, the lid and the base are integrally formed in a cylindrical tube shape. The first wall, the second wall, the lid, and the base form a first chamber 540 that is filled with a first liquid as a first liquid lens. The second wall, the third wall, the lid, and the base form a second chamber 550 that is filled with a second liquid as a second liquid lens. The shapes of the liquid lenses are defined by the curvature of the walls.

In one example embodiment, the first and second walls have an identical size with a uniform thickness from the center at the optical axis of the liquid lens system to their own edges, but they are of different curvatures. For instance, the thickness of the wall along the optical axial direction is 1 mm. The diameter or height of the walls, for example, is 94 mm.

The arrangement and curvature of the walls define the shapes of the liquid lenses. In one example embodiment, the first liquid lens is of a concave shape that is 1 mm thick at the optical axis and 3.49 mm thick at the top surface and at the bottom surface. The radius of curvature of the first wall is 726.2 mm, and the radius of curvature of the second wall is 277.5 mm. In one example, the first liquid lens is formed of white Khouang oil with a refractive index of 1.461 at a wavelength of 589.3 nm.

In another example embodiment, the second liquid lens is of a convex shape that is 10.02 mm thick at the optical axis and 2 mm thick at its edge. The radius of curvature of the second wall and the third wall is 277.5 mm. However, this identical arrangement is only for easy production and not necessarily be identical. In one example, the second liquid lens is formed of white vinegar with a refractive index of 1.3495 at a wavelength of 589.3 nm.

In one example embodiment, the first, second and third walls are formed of a transparent solid material that the filled liquids do not permeate through, for example polymethyl methacrylate (PMMA) with a refractive index of 1.486 at a wavelength of 589.3 nm.

By way of example, the first liquid lens and the second liquid lens coact with each other to form an optical axis and compensate for chromatic aberration. The liquid lens system focus a visible light at discrete wavelengths passing through the liquid lens system onto a focal point on the optical axis. For example, the liquid lens system is achromatic for a visible light at wavelengths of 486.1 nm and 656.3 nm at a focal length of 670 mm.

In one example embodiment, the liquid lens system is assembled based on a tube shaped rim (corresponds to the base and lid discussed herein) with corresponding shoulders for keeping the solid lenses in suitable places. The system is sealed with either water tight silicone or press fit with corresponding suitable sealing rings and retaining collars. For example, there are two holes on the rim in each liquid filling chamber for filling liquids into the chamber and for air coming out from the chamber. After the filling process is finished, those two holes are sealed with silicone or glue.

Although the description referred to particular embodiments, it will be clear to one skilled in the art that example embodiments include variation of these specific details. Hence this invention should not be construed as limited to the embodiments set forth herein.

For example, the number of lenses incorporated in the optical system may be flexible according to the user's preference. Furthermore, the optical characteristic of the liquid may or may not be manually adjusted. The liquid is either natural or man-made. For example, water, oil, sugar or salt solution or a combination of all, and other organic or inorganic solution may be used as the liquid. The solid lenses material can be selected from glasses, plastics, and/or other transparent materials.

For another example, the liquid lens system involves utilizing at least one liquid as lens element that has achromatic functions, i.e. correcting chromatic error created by a single lens. The achromatic function is obtained through liquid with solid combination, liquid with liquid combination and/or liquid with other material combination;

The ingredient of the liquid(s) involved in these liquid lenses can be natural or can be manually fine-tuned or adjusted, for example by mixing more than one solutions or dissolving one or more than one transparent substance into a particular liquid.

As used herein, "chromatic aberration" is a physical phenomenon resulting from dispersion in which there is a failure of a lens to focus light at different wavelengths to the same convergence point or focal point.

As used herein, an "achromatic optical system" is a system that limits the effects of chromatic aberration.

What is claimed is:

1. A liquid lens system, comprising:
  a frame formed of a transparent solid material including a first wall and a second wall;
  a lid formed on a top surface of the frame; and
  a base formed on a bottom surface of the frame such that the frame, the lid, and the base form a chamber filled with a liquid,
  wherein the lid and the base are integrally formed in a cylindrical tube shape;
  wherein there are two sealable holes on the lid or the base;
  wherein the two sealable holes are configured to:
    (a) manually adjust ingredients of the liquid; and
    (b) replace the liquid;
  wherein each of the first wall and the second wall has a uniform thickness from a center to its own edges;
  wherein the liquid in the chamber forms a liquid lens to focus a visible light at discrete wavelengths passing through the liquid lens system onto a focal point on an optical axis; and
  wherein the first wall and the second wall have curvatures that define a shape of the liquid lens.

2. The liquid lens system of claim 1, wherein the liquid is white vinegar having a refractive index of 1.3495 at a wavelength of 589.3 nm.

3. The liquid lens system of claim 1, wherein the chamber is 8.88 mm wide at the optical axis and 2 mm wide at the top surface and at the bottom surface.

4. A liquid lens system, comprising:
  a frame formed of a transparent solid material including a first wall, a second wall, and a third wall, the second wall disposed between the first wall and the third wall;
  a lid formed on a top surface of the frame;
  a base formed on a bottom surface of the frame with sealing components;
  a first chamber formed by the first wall, the second wall, the lid, and the base and filled with a first liquid; and
  a second chamber formed by the second wall, the third wall, the lid, and the base and filled with a second liquid,
  wherein the lid and the base are integrally formed in a cylindrical tube shape;
  wherein each of the first and second chamber includes two sealable holes;
  wherein the two sealable holes are configured to:
    (a) manually adjust ingredients of the first liquid and the second liquid; and
    (b) replace the first liquid and the second liquid;
  wherein the first wall, the second wall, the third wall, the first liquid, and the second liquid coact with each other to form an optical axis and focus a visible light at discrete wavelengths passing through the liquid lens system onto a focal point on the optical axis;
  wherein each of the first wall, the second wall and the third wall has a uniform thickness from a center to its own edges;
  wherein a radius of curvature of the first wall is different from the radius of curvature of the second and third walls; and
  wherein the curvature of the first wall, the second and third walls define a shape of the first and second chamber.

5. The liquid lens system of claim 4, wherein the first liquid is white Khouang oil having a refractive index of 1.461 at a wavelength of 589.3 nm.

6. The liquid lens system of claim 4, wherein the second liquid is white vinegar having a refractive index of 1.3495 at a wavelength of 589.3 nm.

7. The liquid lens system of claim 4, wherein a radius of curvature of the first wall is 726.2 mm, and a radius of curvature of the second and third wall is 277.5 mm.

8. The liquid lens system of claim 4, wherein the first wall, the second wall, and the third wall have a uniform thickness of 1 mm.

9. The liquid lens system of claim 4, wherein the first chamber is 1 mm wide at the optical axis and 3.49 mm wide at the top and bottom surfaces.

10. The liquid lens system of claim 4, wherein the second chamber is 10.02 mm wide at the optical axis and 2 mm wide at the top and bottom surfaces.

11. The liquid lens system of claim 4, wherein the first liquid in the chamber forms a first liquid lens, and the second liquid in the chamber forms a second liquid lens, the first liquid lens compensates for a chromatic aberration of the second liquid lens.

12. A liquid lens system that corrects chromatic aberration, comprising:
    a first liquid lens formed of a first transparent liquid sandwiched between a first wall and a second wall;
    a second liquid lens formed of a second transparent liquid sandwiched between the second wall and a third wall and compensates for a chromatic aberration of the first liquid lens;
    a cover formed on a top end of the first and second liquid lens; and
    a base formed on a bottom end of the first and second liquid lens,
    wherein the first liquid and the second liquid coact with each other to form an optical axis and focus a visible light at discrete wavelengths passing through the liquid lens system onto a focal point on the optical axis,
    wherein the first transparent liquid and the second transparent liquid have refractive indices that differ from each other to compensate each other for the chromatic aberration;
    wherein the cover and the base are integrally formed in a cylindrical tube shape;
    wherein there are two sealable holes on the cover or the base;
    wherein the two sealable holes are configured to:
        (a) manually adjust ingredients of the first transparent liquid and the second transparent liquid; and
        (b) replace the first transparent liquid and the second transparent liquid;
    wherein each of the first wall, the second wall and the third wall has a uniform thickness from a center to its own edges;
    wherein a radius of curvature of the first wall is different from the radius of curvature of the second and third walls; and
    wherein the curvature of the first wall, the second and third walls define a shape of the first and second liquid lens.

13. The liquid lens system of claim 12, wherein the first transparent liquid and the second transparent liquid are natural or manually formed by mixing two or more transparent liquids or adding one or more substances to a liquid such that the first transparent liquid and the second transparent liquid have refractive indices that differ from each other to compensate each other for the chromatic aberration.

14. The liquid lens system of claim 12, wherein the first wall, the second wall and the third wall are formed of a transparent solid material that the first transparent liquid and the second transparent liquid do not permeate through.

15. The liquid lens system of claim 12, wherein the cover contacts a top surface of the first wall, the second wall, the third wall, the first transparent liquid and the second transparent liquid.

16. The liquid lens system of claim 12 is achromatic for a visible light at wavelengths of 468.1 nm and 656.3 nm at a focal length of 670 mm.

17. The liquid lens system of claim 12 is achromatic over a range of wavelengths between 486.1 nm and 656.3 nm.

* * * * *